United States Patent [19]

Motek

[11] 3,995,816
[45] Dec. 7, 1976

[54] METHOD OF AND APPARATUS FOR FRAGMENTING AUTOMOBILE TIRES AND ANALOGOUS ARTICLES

[75] Inventor: Herbert Motek, Altenberge, Germany

[73] Assignee: Hazemag Dr. E. Andreas KG, Munster, Germany

[22] Filed: Apr. 9, 1975

[21] Appl. No.: 566,335

Related U.S. Application Data

[62] Division of Ser. No. 476,705, June 5, 1974.

[30] Foreign Application Priority Data

June 7, 1973 Germany .......................... 2329017

[52] U.S. Cl. .................................. 241/23; 241/24; 241/DIG. 31; 241/DIG. 37
[51] Int. Cl.² ........................................ B02C 21/00
[58] Field of Search ............... 241/DIG. 37, 23, 24, 241/243, 189 R, 275

[56] References Cited

UNITED STATES PATENTS

| | | | |
|---|---|---|---|
| 2,462,645 | 2/1949 | Knowland | 241/24 |
| 2,891,734 | 6/1959 | Andreas | 241/189 R |
| 2,993,657 | 7/1961 | Meyer | 241/189 R |
| 3,602,444 | 8/1971 | Meyer | 241/243 |
| 3,718,284 | 2/1973 | Richardson | 241/DIG. 37 |

*Primary Examiner*—Granville Y. Custer, Jr.
*Attorney, Agent, or Firm*—Michael J. Striker

[57] ABSTRACT

Automobile tires and analogous articles of rubber or synthetic plastic material are frozen to make them brittle, and thereupon are fragmented in order to separate their rubber or synthetic plastic material from embedded reinforcements of textile or analogous fabrics. The fragmenting is carried out by dropping the articles into an impact mill in which a rotor equipped with striking elements turns about a horizontal axis, so that the articles are hit by the striking elements of the rotor and flung in circumferential direction of movement of the rotor against impact plates from which they drop back onto the rotor, whereby the articles are fragmented by the repeated hits and impacting. An apparatus for carrying out the method is also disclosed.

9 Claims, 1 Drawing Figure

U.S. Patent  Dec. 7, 1976  3,995,816
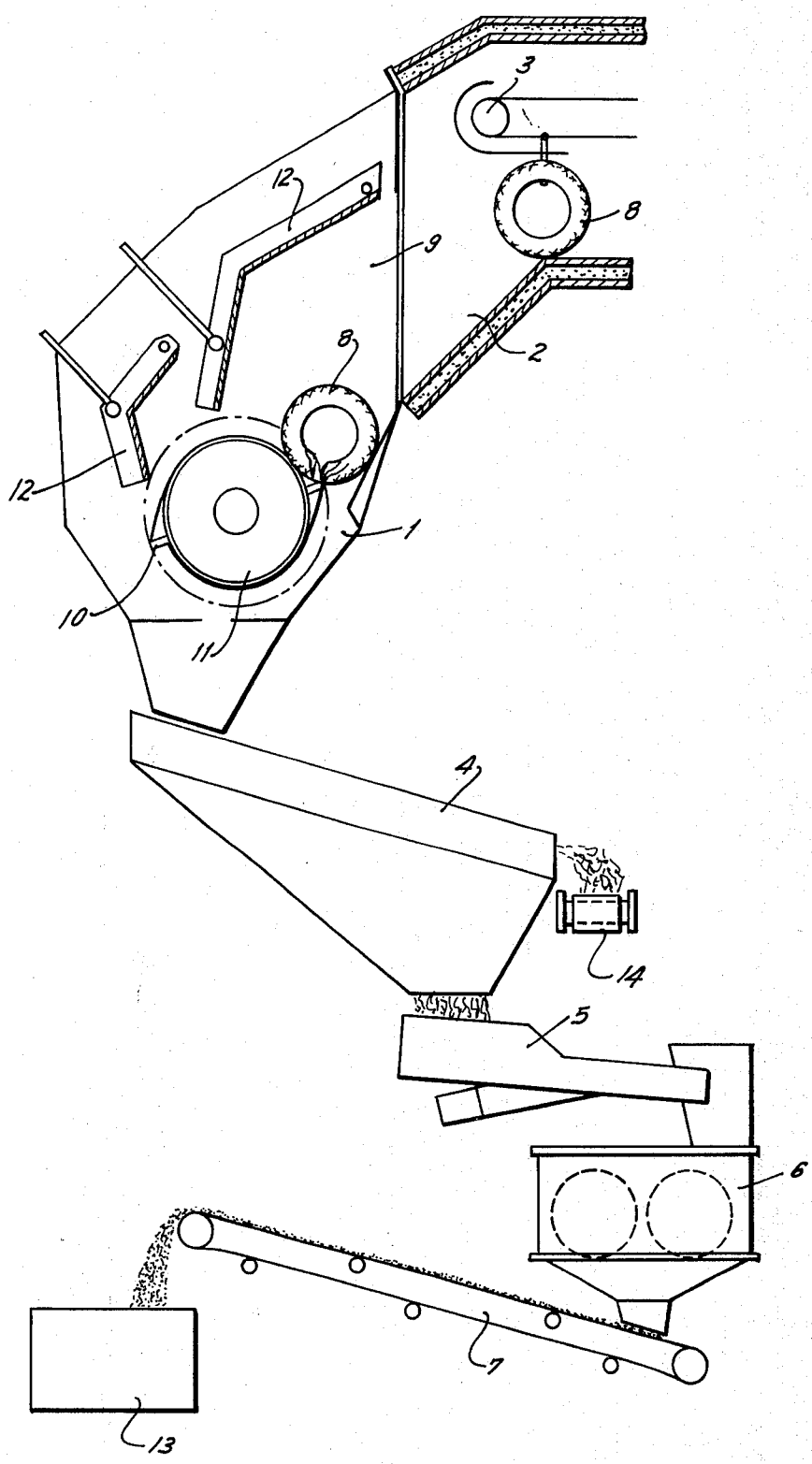

METHOD OF AND APPARATUS FOR FRAGMENTING AUTOMOBILE TIRES AND ANALOGOUS ARTICLES

This is a division of application Ser. No. 476,705, filed June 5, 1974.

BACKGROUND OF THE INVENTION

The present invention relates generally to the fragmenting of articles made from rubber or synthetic plastic material, and more particularly to the fragmenting of such articles, and in particlar of automobile tires, which contain reinforced embedments of textile or other substances, such as wire mesh or the like.

Specifically, the invention relates to a method of carrying out such fragmenting, and to an apparatus for carrying out the method.

It has long been the general practice to discard automobile tires and analogous articles made of rubber or synthetic plastic material which have become worn and unuseable. The general practice has been to either bury such articles or to burn them. In recent years, however, it has been recognized that it is unwise economically and ecologically to discard so large a source of potentially recoverable materials, especially in an age of dwindling supplies of raw materials. It has therefore been proposed in the prior art to provide equipment for recovering the rubber or synthetic plastic material of automobile tires or analogous articles which have become otherwise unuseable. Particularly in the case of automobile tires, this essentially presents the problem of separating the rubber or synthetic plastic of the tire from the textile or metallic reinforcements which are embedded in the tire.

The prior art has proposed to freeze the articles to be processed, based on the well known fact that rubber and synthetic plastic material become brittle when frozen and can therefore be more readily fragmented. Thus, one prior-art proposal suggests to freeze the tires, place them flat upon an anvil plate and pound them with a mechanically or hydraulically actuated hammer or ram which is intended to fragment the tire.

Unfortunately, the prior-art approach has not been entirely satisfactory, because a satisfactory separation of the rubber or synthetic plastic material from the embedded reinforcements could not be obtained. Even if the blows upon the tire, which term hereafter will be used generically to refer to all articles whose rubber or synthetic plastic material is to be recovered, are repeated several times, the results are not satisfactory because the hammer hits the tire always in the same places. Especially the rather strong and resistant wire rings which are embedded in the bead of the tire are hit always transverse to their general plane, so that they are not subjected to any bending stresses and do not become satisfactorily separated from the tire material. When subsequently the more or less fragmented tire is passed though a magnetic separator to remove any wire or metallic components from it, these metallic components always take along a rather large proportion of the rubber or synthetic plastic material which still adheres to them and has not been satisfactorily separated from them, and this proportion is either lost or must be removed by a separate and expensive operation. If textile reinforcements are involved which also cannot be satisfactorily removed according to the prior art, then they continue with the more or less fragmented tire material into a subsequent comminuting mill in which they are comminuted together with the rubber or synthetic plastic tire material and contaminate this material.

SUMMARY OF THE INVENTION

Accordingly, it is a general object of the invention to overcome the disadvantages of the prior art as outlined above.

More particularly, it is an object of the present invention to provide an improved method of fragmenting articles of rubber or synthetic plastic material, and separating such material from any embedded reinforcements of a textile or other character.

Another object is to provide an apparatus for carrying out the novel method.

In keeping with the above objects, and with others which will become apparent hereafter, one feature of the invention resides in an apparatus for fragmenting automobile tires and analogous articles of rubber or synthetic plastic material which have been frozen to make them brittle, so as to separate their material from embedded reinforcements of textile or analogous substances, and in this apparatus a combination is provided which comprises an impact mill or impactor with a rotor mounted for rotation about a horizontal axis and having a plurality of circumferentially spaced striking elements which move about said axis in an orbital path having an apex to which said striking elements move upwardly from below at one side of the axis and from which they move downwardly at the other side of the axis. Feeding means is provided for gravity-feeding articles to be fragmented in a downward direction to be hit by the striking elements at the one side and in the region of the apex. A housing surrounds the rotor and forms a chamber extending from the feeding means in direction of rotation of the rotor, and impact elements are arranged in this chamber above the rotor and at its other side and so spaced from the rotor that articles hit by the striking elememts are freely flung against the impact elements and can drop back upon the rotor to be hit again.

The invention is based upon the quite surprising and unexpected finding that a proper fragmentation of tires or other articles of synthetic plastic or rubber material can be obtained, with a concomitant complete release of such material from embedded reinforcements, if the fragmentation is carried out in an impactor having the type mentioned above. Impactors of this general type are, for instance, known from U.S. Pat. No. 3,602,444. It has been found that the purposes of the invention and the advantages achieved thereby can be obtained only by using this type of impactor, that is an impactor having the aforementioned rotor which rotates about a horizontal axis and which has striking elements that strike the incoming material and fling it in the direction of rotation of the rotor against impact plates from which the material then falls back upon the rotor. Other types of mechanical fragmenting apparatus, such as for instance hammermills, are not suitable and cannot obtain the advantages and purposes of the present invention.

It is important in accordance with the invention that the tires and other articles which are hit by the orbiting striking members of the rotor be freely flung against the impact plates, because only in this manner is it possible to attain an almost complete separation of the tire material from wire or textile reinforcements embedded in it without at the same time experiencing a fragmenting of the reinforcements into small pieces which might cling to the tire material per se and be difficult or impossible to separate from it during the latter processing. The reason for this advantage is that in an impactor of the type in question the tires or other articles are in effect subjected only to random impacts so that the impact forces act upon the article at different times in many different directions, rather than acting more or less consistently in one general direction for the entire time or for most of the time as in the prior art.

It was found that quite surprisingly the fragmented articles will leave an impactor, after having been processed according to the present invention, in a condition in which the reinforcements are almost entirely free of adhering rubber or synthetic plastic material, and in which the reinforcements have assumed a tangled ball-shaped or knot-shaped configuration and can thus be readily separated from the rubber or synthetic plastic fragments by screening. Moreover, the fragmenting of a tire or analogous article proceeds very rapidly when carried out according to the present invention, so that the rubber or plastic fragments, which leave the impactor free of any embedded reinforcements, are still sufficiently cold from the previous freezing so that they can be further broken up into smaller particles by then passing them through a hammermill.

The time required to fragment an individual tire or analogous article in accordance with the present invention is only on the order of approximately 6-10 seconds. This means that it is possible to admit the tires or similar articles individually and one-at-a-time into the impactor, so that the fragmenting of a preceding article is completed or almost completed by the time the next article is admitted into the impactor, whereby improved impacting and fragmenting is obtained. Due to the very brief time required for the fragmenting of each individual article, even the separate and successive admission of the articles into the impactor makes it possible to obtain a throughput of approximately 300-600 tires or similar articles per hour, which is an excellent and economically highly advantageous figure. It is particularly helpful if the housing and rotor width—in the direction of the axis of rotation of the rotor—are relatively narrow so that the tires or similar articles cannot be admitted and impacted while in a lying down condition, but must more or less stand on edge. It has been found that this is advantageous because the fragmentation and separation of the tire material from the reinforcements is particularly good when, at least at the beginning of the operation, the hits act upon the tire more or less radially from the outer periphery thereof, to assure that the reinforcements, including the wire reinforcing rings in the beads of the tire, are subjected to high bending stresses. It is also advantageous if neither the striking elements on the rotor itself, nor the impact plates against which the tires are flung by the rotor, have any projections, teeth or the like, but are all smooth-surfaced, including their edges. This prevents entangling of the separated reinforcements on these elements since there is nothing in the way of projections or the like onto which these reinforcements could hook themselves.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a diagrammatic side view, partly in section, illustrating an apparatus for carrying out the present invention.

DESCRIPTION OF THE PREFERRED EMBODIMENTS

The apparatus according to the present invention has been illustrated only relatively diagrammatically, because it is believed that this is sufficient for an understanding of the invention. The type of rotor used in the apparatus, and the general operation of an impactor of the type which will be discussed with respect to the FIGURE, is already known, for instance from the aforementioned U.S. patents. An installation for freezing tires or other articles made from rubber or synthetic plastic material, for the purpose of making them brittle and more readily fragmentizable, is also disclosed from the art, for instance from German Patent application No. 2,155,380, and directs streams of a liquefied gas over the tires. Of course, the tires could also be dipped into a body of liquefied gas, or otherwise be refrigerated to the necessary extent.

Referring now specifically to the FIGURE, it will be seen that reference numeral 1 identifies an impactor having an inlet hood 2. A belt or other conveyor 3 identifies a feeding arrangement by means of which frozen articles 8, here illustrated as old tires, are conveyed into the hood 2.

The housing of the apparatus surrounds a chamber 9 in which a rotor 11 is mounted for rotation in counterclockwise direction. When the tires 8 are discharged from the conveyor 3 and allowed to drop under the influence of gravity into the chamber 9 by rolling or sliding downwardly into it, they enter the region of the orbital path of the elongated (in the direction of the axis of rotation of the rotor) striking elements or bars 10 which are mounted on the rotor circumferentially distributed thereabout. Since the rotor turns in counterclockwise direction, the striking elements 10 move in upward direction on the right-hand side of the axis of rotation, until they reach the apex of their movement, and then begin to move downwardly from the apex on the left-hand side of the axis of rotation. The term right-hand and left-hand side refers to the illustration where the axis of rotation is horizontal or substantially so. The tires 8 therefore are hit in the region of the right-hand side of the axis of rotation, and the striking takes place with very great force since the rotor can rotate at high speed. Because the tires are brittle due to the previous refrigeration, they are already broken apart with the first hit received from one of the striking elements 10 which at the same time flings the tire in the direction of rotation towards the left against a first impact plate 12 which is spaced far enough from the rotor so that the tires can be freely flung against them. When a tire hits this impact plate 12, or a second impact plate 12, it becomes again further fragmented. Because of the manner in which the impact plates 12 are mounted with respect to the rotor, the fragments can fall off the impact plates 12 and back onto the rotor where they receive further hits by the striking elements 10.

In a surprisingly brief period of time, that is approximately 6–10 seconds for a tire, the material of the tire is fragmented to such an extent that it has completely or almost completely become separated from the embedded reinforcements and can now drop out of the chamber 9 through the illustrated lower outlet thereof. The impact plates 12 may be made adjustable, as diagrammatically shown, in order to be able to set them to different optimum positions that might be required in dependence upon different materials being fragmented.

Arranged below the outlet of the chamber, so as to receive the fragmented rubber or synthetic plastic particles and the reinforcement material which has been separated from them, is a screen arrangement 4, that is for instance an arrangement provided with a vibratory screen onto which the material drops. The vibration of the screen causes the rubber or synthetic plastic fragments to fall through the openings of the screen, whereas the reinforcement material is retained on the screen and can be discarded. The reference numeral 14 identifies a conveyor onto which the reinforcement material and any rubber or synthetic plastic fragments which are too large to pass through the openings of the screen 4, can slide—due to the fact that the screen 4 in inclined downwardly to the conveyor 14—and which carries them away.

The material that has passed through the screen 4 may drop onto a metering device 5 whose particular construction is of no consequence for the invention, and which can discharge metered quantities of this material into a hammermill 6 of conventional construction, wherein the fragments are made still smaller by being pounded with hammers, to be subsequently discharged and carried on a conveyor 7 to a receptacle 13 for further use.

The present invention thus provides for a method of fragmenting tires and analogous articles and separating their rubber or synthetic plastic material from embedded reinforcements, and for an apparatus for carrying out the method, which avoid the disadvantages of the prior art and permit a rapid and highly economical recovery of the rubber or synthetic plastic material for further use.

It will be understood that each of the elements described above, or two or more together, may also find a useful application in other types of constructions differing from the type described above.

While the invention has been illustrated and described as embodied in the fragmenting of articles of rubber or synthetic plastic material and the separation of embedded reinforcements from such material, it is not intended to be limited to the details shown since various modifications and structural changes may be made without departing in any way from the spirit of the present invention.

Without further analysis, the foregoing will so fully reveal the gist of the present invention that others can by applying current knowledge, readily adapt it for various applications without omitting features that from the standpoint of prior art fairly constitute essential characteristics of the generic or specific aspects of this invention.

What is claimed as new and desired to be protected by Letters Patent is set forth in the appended claims.

I claim:

1. A method of fragmenting automobile tires and analogous articles of rubber or synthetic plastic material so as to separate their material from embedded reinforcements of textile or other substances, by freezing the articles to make their material brittle and exposing them to hitting forces, comprising the steps of feeding the frozen articles into an impactor having a rotor which turns about a horizontal axis and is provided with smooth striking elements which hit the incoming particles and fling them in circumferential direction of said rotor freely against smooth impact elements arranged above the rotor, so that thereupon they fall back upon said rotor to be repeatedly hit by the striking element and freely flung against the impact elements, whereby the articles are subjected to pure hitting and impact forces from different directions upon contact with the smooth striking and impact elements so that the material is fragmented and the fragments dissociate from the reinforcements and the latter remain intact; screening the fragments into which the articles are shattered, so as to separate the liberated reinforcements therefrom; and particulizing the screened fragments in a hammermill.

2. A method of disintegrating automobile tires and analogous articles of materials which are yieldable at normal temperatures and brittle at sub-freezing temperatures and which have reinforcements embedded therein, comprising the steps of freezing the respective article to make the yieldable material thereof brittle; introducing the frozen article into a confining space bounded by confining surfaces which restrict the article to movement only along a substantially vertical plane, and by impact surfaces extending between the confining surfaces; subjecting the article in the confining space to a series of hits from below to thereby fling the article upwardly against the impact surfaces so as to be subjected to a series of impacts upon contact with the impact surfaces, the hits and impacts acting on the article from different directions so as to fragment the material of the article and dissociate the fragments from the reinforcements that remain intact; and separating the dissociated fragments from the reinforcements.

3. A method as defined in claim 2, comprising the steps of admitting each article into said impactor individually and only when the preceding article is already at least substantially fragmented, so that no more than one article is being fragmented at a time.

4. A method as defined in claim 2, wherein said subjecting step includes contacting the article with a rotor which rotates about a horizontal axis and has striking elements adapted to strike the article to fling the same against impact elements in said confining space from which the article rebounds toward the rotor, the striking and impact elements subjecting the article to the hits and impacts.

5. A method of fragmenting automobile tires and analogous articles of rubber or synthetic plastic material so as to separate the material from embedded reinforcements of textile or other substances, by freezing the articles to make the material brittle and exposing them to hitting forces, comprising the steps of feeding the frozen articles into an impactor having a rotor which turns about a horizontal axis and is provided with smooth striking elements which hit the respective article from below and freely fling the same upwardly in circumferential direction of the rotor against smooth impact elements arranged above the rotor so as to contact and rebound from such impact elements and to be subjected to impact forces during such contact to thereafter fall back upon the rotor to be repeatedly hit by the striking elements and freely flung against the impact elements, whereby the articles are subjected to pure hitting and impact forces from different directions upon contact with the smooth striking and impact elements, which forces fragment the material and dissociate the fragments from the reinforcements that remain intact; and separating the dissociated fragments from the reinforcements.

6. A method as defined in claim 5; wherein said separating step includes screening the fragments into which said articles are shattered.

7. A method as defined in claim 5; and further comprising the step of particularizing the separated fragments in a hammermill.

8. A method as defined in claim 5, wherein said articles are fed into said impactor from above said rotor.

9. A method as defined in claim 5, wherein each of said articles is fed into said impactor individually and only when the preceding article is already at least substantially fragmented, so that no more than one article is being fragmented at a time.

* * * * *